United States Patent [19]
Satoh et al.

[11] Patent Number: 5,221,130
[45] Date of Patent: Jun. 22, 1993

[54] CHOKE-COIL FIXTURE FOR MINIATURE MOTORS

[75] Inventors: Hajime Satoh; Hiroshi Yamazaki; Seiichi Watanabe, all of Matsudo, Japan

[73] Assignee: AT&T Bell Laboratories, Murray Hill, N.J.

[21] Appl. No.: 874,640

[22] Filed: Apr. 27, 1992

[30] Foreign Application Priority Data

Apr. 30, 1991 [JP] Japan ................ 3-30083[U]
Apr. 30, 1991 [JP] Japan ................ 3-30084[U]
Apr. 30, 1991 [JP] Japan ................ 3-30085[U]
Apr. 30, 1991 [JP] Japan ................ 3-30086[U]

[51] Int. Cl.⁵ .............. H02K 11/00; H02K 5/24; H02K 5/14
[52] U.S. Cl. .............. 310/239; 310/68 R; 310/51; 310/40 MM
[58] Field of Search ........... 310/40 MM, 68 R, 68 C, 310/51, 71, 239, 89, 221

[56] References Cited

U.S. PATENT DOCUMENTS

| | | | |
|---|---|---|---|
| 4,342,934 | 8/1982 | van Wijhe et al. | 310/239 |
| 4,673,837 | 6/1987 | Gingerich et al. | 310/239 |
| 4,845,393 | 7/1989 | Burgess et al. | 310/51 |
| 4,900,966 | 2/1990 | Winter et al. | 310/239 |
| 5,064,342 | 11/1991 | Iwai | 310/51 |

FOREIGN PATENT DOCUMENTS

| | | | |
|---|---|---|---|
| 0415367 | 3/1991 | European Pat. Off. | 310/51 |
| 0111644 | 8/1980 | Japan | 310/40 MM |

*Primary Examiner*—Steven L. Stephan
*Assistant Examiner*—C. LaBalle
*Attorney, Agent, or Firm*—David I. Caplan

[57] ABSTRACT

A choke-coil fixture for miniature motors of a type having choke coils housed in recesses formed in an end bell closing an end of a motor housing, characterized in that choke-coil housing recesses are formed in such a manner as to lock ends of the choke coils when the choke coils are inserted into the recesses in the longitudinal direction, terminals having flat portions for pushing the other ends of the choke coils at portions electrically connecting the lead ends of the choke coils, and engaging portions for locking to the end bell is disclosed. The terminals for miniature motors can have positioning portions for positioning the terminals with respect to the lead ends of the choke coils, and cylindrical portions for engaging with the connecting power-feeding connecting pins; the cylindrical portion adapted to be flexible in size by being plastically deformed. A choke-coil fixture for miniature motors having insulating washers for insulating the other lead ends from the terminals by engaging with the choke coils inserted into recesses for housing the choke coils is disclosed.

3 Claims, 8 Drawing Sheets

CHOKE-COIL FIXTURE FOR MINIATURE MOTORS

BACKGROUND OF THE INVENTION

This invention relates generally to a mechanism for mounting choke coils incorporated in an end bell closing and end of a motor housing, and more particularly to a mechanism for mounting choke coils in a miniature motor that is effective when the miniature motor is used for an automotive fuel pump.

DESCRIPTION OF THE PRIOR ART

When a miniature motor is used for an automotive fuel pump, etc., choke coils are often mounted in an end bell closing an end of the motor housing. In this following, a fixture for mounting choke coils to a miniature motor will be described.

FIG. 16 is a diagram showing a soft ferrite. FIG. 17 shows a coil.

FIG. 18 is a diagram showing a choke coil consisting of a soft ferrite and a coil.

FIG. 19 is a diagram of assistance in explaining a recesses for housing choke coils in a miniature motor. FIG. 20 is a diagram of assistance in explaining a choke coil housed in a recess provided on an end bell of a miniature motor. FIG. 21 is a diagram illustrating the external appearance of a miniature motor.

A choke coil 41 is completed by inserting a soft ferrite 42 to which adhesive 44 is applied onto a coil 43 formed by winding an insulated wire, and then drying the adhesive 44.

In the miniature motor, on the other hand, a rotating shaft 92 is protruded from an end of a housing 91, and terminals 73 and 73' for feeding power from a power source (not shown) are provided on the outer surface of an end bell 61 closing the other end of the housing 91, as shown in FIG. 21.

On the inner end surface, for example, of the end bell 61 provided are choke-coil housing recesses 72 and 72' for housing choke coils 41, terminal ends 74 and 74' electrically connected to the terminals 73 and 73', brushes 75 and 75', and terminals 79 and 79', as shown in FIG. 19. Furthermore, at least one rib 76 is formed inside each of the choke-coil housing recesses 72 and 72'.

The choke coil 41 is by press-fitted to the rib 76 provided on the choke-coil housing recess 72 and fitted to the end bell 61.

The coil 43 formed by an insulated wire is apt to be deformed by external force. When the soft ferrite 42 is inserted into the inside of the coil 43 and bonded to the coil 43 with the adhesive 44, the choke coil 41 is not readily deformed even when press-fitted into the choke-coil housing recess 72 because a certain strength is imparted to the choke coil 43.

The soft ferrite 42 which is bonded to the coil 43 with the adhesive 44 does not readily fall off from the choke-coil housing recess 72.

The lead ends 45 and 45' of the choke coil 41 housed in the choke-coil housing recess 72, as described above, are temporarily hooked on notches 77 formed at terminal ends 74, and then electrically connected to the notches 77 by soldering.

Connecting pins connected to a power source (not shown) are connected to the terminals 73 of the miniature motor having the aforementioned construction. Current fed to an end of the connecting pins flows in the terminal 73, the terminal end 74, the choke coil 41, the terminal 79, the brush 75', a commutator (not shown), an armature (not shown), the brush 75 on the other side, the terminal 79', the choke coil 41', the terminal end 74', and the terminal 73' to the other end of the power source via a connecting wire (not shown).

The miniature motor in the aforementioned prior art, in which the soft ferrite 42 and the coil 43 are bonded with the adhesive 44, involves the use of adhesive, and time and labor for applying and drying the adhesive.

In view of the fact that the miniature motor used in an automotive fuel pump is immersed in gasoline, the adhesive 44 used for bonding the soft ferrite 42 to the coil 43 must be of a special type whose bonding strength does not deteriorate even when immersed in gasoline. In the prior art, the use of such an adhesive to bond the soft ferrite 42 to the coil 43 leads to increased cost.

Furthermore, when the choke coil 41 in the prior art is press-fitted into the rib 76 of the choke-coil housing recess 72 formed on the end bell 61, if the size of the rib 76 is too large, the choke coil 41 cannot be housed in the recess 72, and if the size of the rib 76 is too small, the choke coil 41 falls off from the choke-coil housing recess 72.

The prior art therefore has a disadvantage in that the size and shape of the rib 76 must be strictly controlled.

In the prior art, however, the size of the choke coil 41 shown in FIG. 18 and the choke-coil housing recess 72 shown in FIG. 19, and the relative positions of the lead ends 45 and 45' of the choke coil 41 are not necessarily kept constant.

As a result, the lead ends 45 and 45' have to be drawn to the terminal ends 74 and 74' and the to terminals 79 and 79'

The lead ends 45 and 45' are press-fitted to grooves formed on the terminal ends 74 and 74' and the terminal 79 and 79', and then soldered.

For this reason, the lead ends 45 and 45' and the terminal ends 74 and 74' and the terminals 79 and 79' are connected with a small contact area in a state where they intersect with each other at right angles. The reliability of electrical connection with an extremely small contact area tends to depend on the state of soldering.

In a miniature motor having a terminal 73 of a shape shown in FIG. 21, the end bell 61 made of an insulating material and the terminal 73 made of an electrically conductive material have to be integrally molded using an insert. This tends to increase manufacturing cost. To cope with this, a construction similar to the construction of the terminal 62 as described earlier, referring to FIG. 22, has been conceived.

In the construction shown in FIG. 22 in which the end bell 61 and the cylindrical portion 64 of the terminal 62 are permanently fitted to each other, connecting pins (not shown) for feeding power from a power source are press-fitted to the cylindrical portions 64 of the terminals 62. To positively press-fitting the connecting pins into the cylindrical portions 64, however, the distance between the two cylindrical portions (that is, for accepting positive and negative connecting pins, though another cylindrical portion is not shown in the figure) and the distance between the two connecting pins for inserting into the two cylindrical portions 64 must be strictly controlled. Control of the dimensions of these parts tends to increase the manufacturing cost of miniature motors. Lowering quality control to obtain inexpensive parts could lead to deteriorated reliability of miniature motors due to the use of parts of poor dimensional accuracy.

FIG. 23 is a diagram of assistance in explaining the state where the choke coil is inserted into the choke-coil housing recess provided on the end bell. FIG. 24 is a cross-sectional view illustrating the state where the choke coil is fitted to the choke-coil housing recess.

In FIGS. 23 and 24, a choke coil 11 consists of a coil formed by winding an insulated wire and a soft ferrite 12 inserted into the coil.

An end bell 31 closing an end of a motor housing (not shown) has a choke-coil housing recess 32 for accommodating the choke coil 11. When assembling a miniature motor, the choke coil 11 is inserted into the choke-coil housing recess 32, and then the adhesive 41 is applied to the choke-coil housing recess 32 in such a manner as to wrap the entire choke coil 11.

A lead end 13 of the choke coil 11 is electrically connected to the terminal 21 and the other lead end 14 to a terminal of a brush holder (not shown).

In the prior art described above, however, the entire choke coil 11 is covered with the adhesive 41 and housed in the choke-coil housing recess 32, the choke coil 11 has low heat dissipation properties. Furthermore, there is a limit in reducing the size of the choke coil 11 because the dimensions of the choke coil 11 are governed by heat dissipation properties.

Moreover, the use of the adhesive 41 to fit the choke coil 11 to the choke-coil housing recess 32 requires time and labor to apply the adhesive to the choke coil 11.

Miniature motors, when used in an automotive fuel pump, are immersed in gasoline. The adhesive 41 must therefore be of a special type whose bonding strength is not deteriorated even by the attack of gasoline. In addition, there is a fear of improperly positioning the choke coil 11 in the choke-coil housing recess 32 if the choke coil 11 happens to be moved by mistake before the adhesive 41 is cured. This could result in unstable accuracy in the relative position of the choke coil 11 with respect to the terminal 21 or a brush-holder terminal (not shown).

SUMMARY OF THE INVENTION

This invention is intended to overcome the aforementioned problems. To achieve this, this invention has the following construction.

The choke-coil fixture for miniature motors of this invention is used in miniature motors having choke coils housed in recesses formed in an end bell closing an end of a motor housing, and is characterized in that recesses for housing choke coils adapted to engage with ends of the choke coils when the choke coils are inserted into the recesses in the longitudinal direction, terminals having flat portions for pushing the other ends of the choke coils at portions electrically connecting to the lead ends of the choke coils, and engaging portions for engaging with the end bell.

The choke-coil fixture for miniature motor of this invention has terminals each comprising a positioning portion for positioning the terminal with respect to the lead end of the choke coil, and a cylindrical portion for engaging with and connecting to a power-feeding connecting pin; the cylindrical portion adapted to be flexible in size by being plastically deformed.

The choke-coil fixture for miniature motors of this invention has insulating washers for insulating the other lead ends and the terminals by engaging with the choke coils inserted into recesses for housing the choke coils is disclosed.

These and other objects and advantages of this invention will become more apparent from the following description of embodiments with reference to the accompanying drawings of FIGS. 1 through 15.

Figure 1:
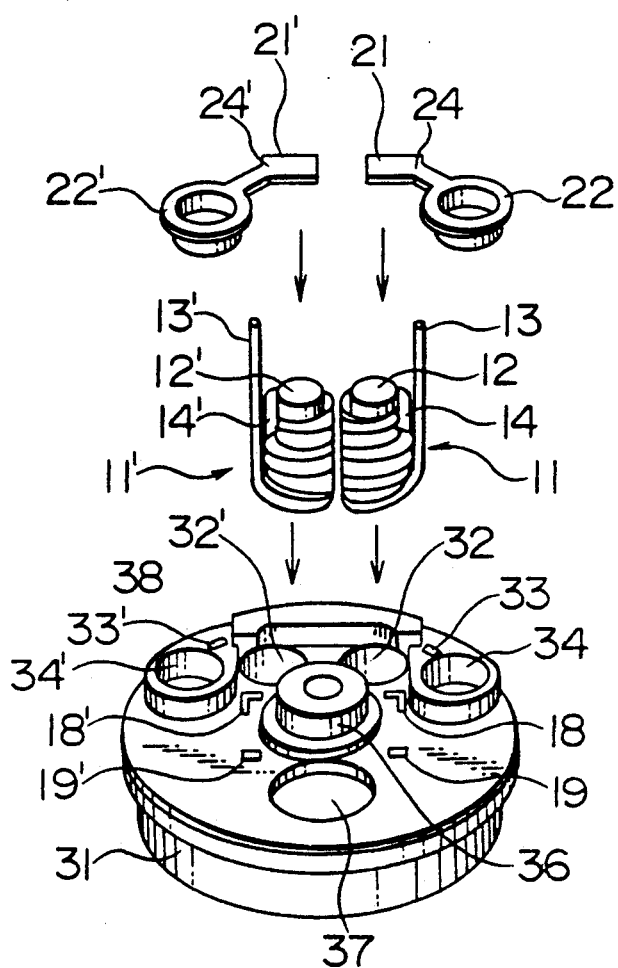
FIG. 1 is a diagram of assistance in explaining an embodiment of this invention when the choke coils are installed on the end bell.

DETAILED DESCRIPTION OF THE EMBODIMENT:

The choke-coil fixture for miniature motors of this invention will be described, referring to FIGS. 1 through 6. FIG. 1 is a diagram of assistance in explaining an embodiment of this invention when the choke coils are fixedly fitted to the end bell.

Figure 2:
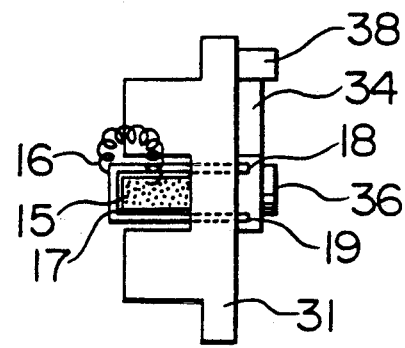
FIG. 2 is a side view of the end bell in FIG. 1.
Figure 3:
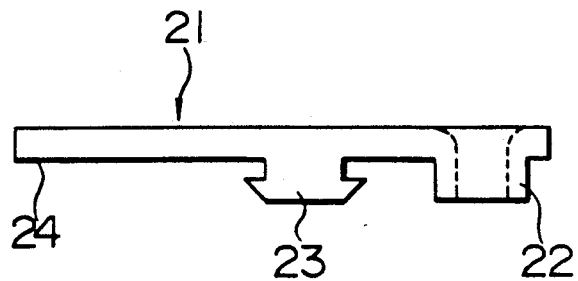
FIG. 3 is a diagram of assistance in explaining an example of the terminal used in this invention.
Figure 4:
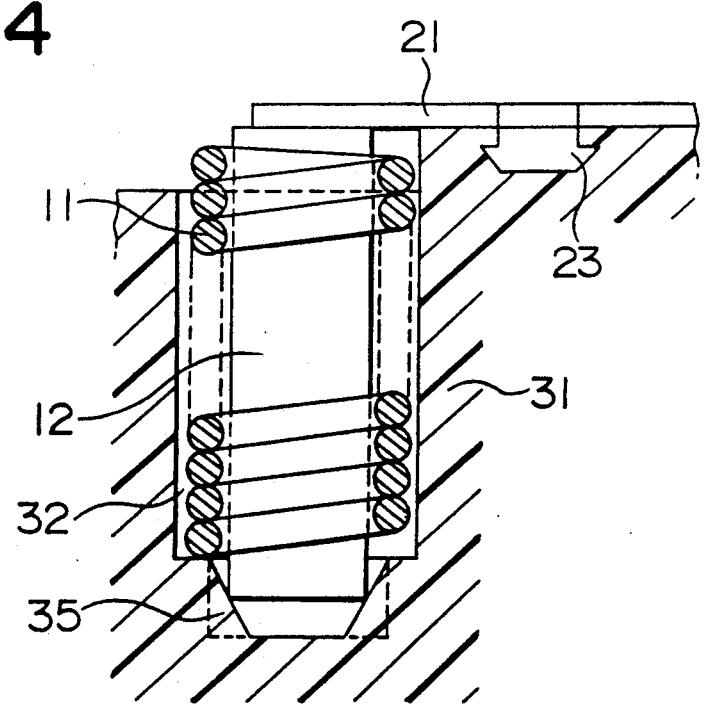
FIG. 4 is a diagram of assistance in explaining the method of placing a choke coil in position by a terminal when the choke coil is inserted in the recess of an end bell.

FIG. 2 is a side view of the end bell shown in FIG. 1. FIG. 3 is a diagram illustrating an example of the terminal of this invention. FIG. 4 is a diagram of assistance in explaining the state where the choke coil is fixedly fitted to the recess of the end bell by means of a terminal.

Figure 5:
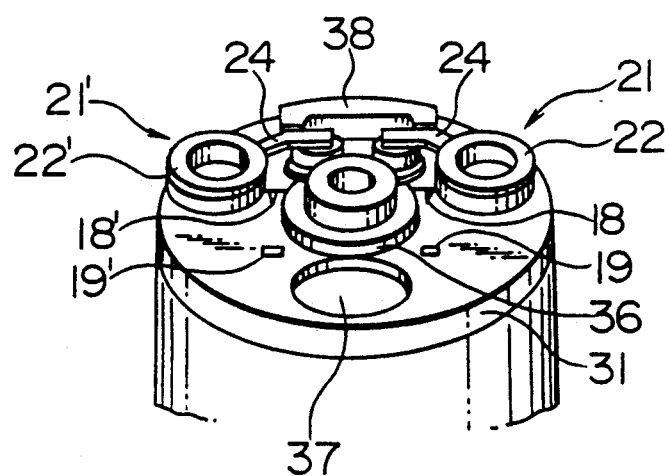
FIG. 5 is a diagram of assistance in explaining the state where the choke coil is fixedly fitted to the end bell of the miniature motor.
Figure 6:
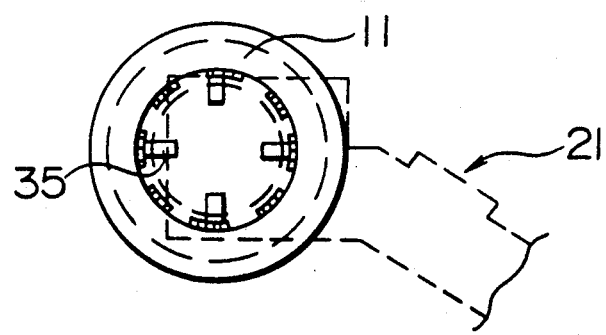
FIG. 6 is a diagram illustrating the choke-coil housing recess shown in FIG. 5, viewed from the bottom thereof.

FIG. 5 is a diagram of assistance in explaining the state where the choke coil is fixedly fitted to the end bell of a miniature motor. FIG. 6 is a diagram illustrating the choke-coil housing recess shown in FIG. 5, viewed from the bottom thereof.

In FIG. 1, on the outside surface of an end bell 31 closing an end of a miniature-motor housing, formed are choke-coil housing recesses 32 and 32' for housing choke coils 11 and 11', locking portions 33 and 33' for fixedly fitting terminals 21 and 21' for retaining soft ferrites 12 and 12' of the choke coils 11 and 11' housed in the choke coil housing recesses 32 and 32', terminal engaging recesses 34 and 34' for engaging with cylindrical portions 22 and 22' of the terminals 21 and 21', a motor shaft 36, an opening 37 for inserting a check valve when gasoline is present in a space between the rotor and the stator, a projection 38 for preventing the retaining portions of the terminal 21 and 21' from moving, and a brush-holder terminal inserting hole (invisible in the figure).

As shown in FIG. 2, on the opposite side of the end bell 31 fixedly fitted are brush holders 15 and 15' (the brush holder 15' is not shown in the figure) to which brushes 17 and 17' (the brush 17' is not shown in the figure) are installed by inserting brush-holder terminals 18 and 19 into the brush-holder inserting holes described above. The brush holders 15 and 15' have pigtails 16.

The terminal 21 shown in FIG. 3 consists of a cylindrical portion 22 formed into a cylindrical shape to accommodate a connecting pin (not shown) when the miniature motor is connected to an external power source (not shown), an engaging portion 23 for engaging with the locking portion 33 of the end bell 31, and a flat portion 24 for electrically connecting to lead ends 13 or 13' of the choke coil 11 shown in FIG. 1.

The choke-coil housing recess 32 formed on the end bell 31 has at least one rib 35 formed on the bottom thereof, as shown in FIGS. 4 and 6.

The choke coils 11 and 11' are inserted into the inside of the choke-coil housing recesses 32 and 32' with the lead ends 13 and 13' directed upwards. The ends of the soft ferrites 12 and 12' inserted into the choke coils 11 and 11' are forced onto the rib 35 formed on the bottom of the choke-coil housing recesses 32 and 32'.

Next, the cylindrical portions 22 and 22' and the engaging portions 23 and 23' of the terminals 21 and 21' are engaged with the terminal engaging recesses 34 and 34' and the locking portions 33 and 33'.

Simultaneously with the installation of the terminals 21 and 21', the flat portions 24 and 24' of the terminals 21 and 21' push the top of the choke coils 11 and 11'. The lead ends 13 and 13' of the choke coils 11 and 11' are bent to an angle of 90 degrees and soldered to the flat portions 24 and 24' of the terminals 21 and 21'.

The other lead ends 14 and 14' of the choke coils 11 and 11' are electrically connected to the brush-holder terminals 18 and 18' by soldering, for example.

In this way, the choke coils 11 and 11' are fixedly fitted by the choke-coil housing recesses 32 and 32' provided on the end bell 31 and the terminal flat portions 24 and 24'.

In the miniature motor having the aforementioned construction, connecting pins (not shown) connected to a power source are engaged with the terminal engaging recesses 34 and 34'.

Current fed from one end of the power source flows in a connecting pin (not shown), the cylindrical portion 22 of the terminal 22, the flat portion 24 of the terminal 21, the lead end 13 of the choke coil 11 connected to the flat portion 24, the choke coil 11, the lead end 14, the brush-holder terminal 18, the brush 17, a commutator (not shown), an armature (not shown), the brush 17', the brush-holder terminal 18', the lead end 14' of the choke coil 11', the choke coil 11', the lead end 13', the flat portion 24' of the terminal 21', the cylindrical portion 22' of the terminal 21', an end of the connecting pin (not shown), and to the other end of the power source.

In this way, electrical connection between the ends connecting wires from a power source and terminals can be easily and positively performed.

According to the above-mentioned embodiment of this invention, the choke coils are inserted in the longitudinal direction into the recesses provided on the end bell, and fixedly fitted to the recesses by the bottom parts of the recesses and the terminals. Thus, the need for adhesive and labor to apply adhesive to the choke coil is eliminated, making it possible to provide an inexpensive miniature motors.

The aforementioned construction prevents the choke coil from falling off from the recess provided on the end bell without improving machining accuracy in press-fitting the choke coil.

Figure 7:
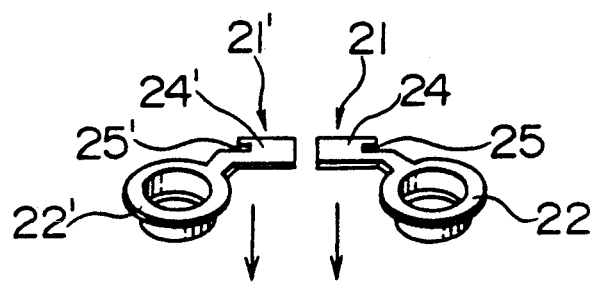
FIG. 7 is a diagram of assistance in explaining another example of the terminals used in this invention.
Figure 8:
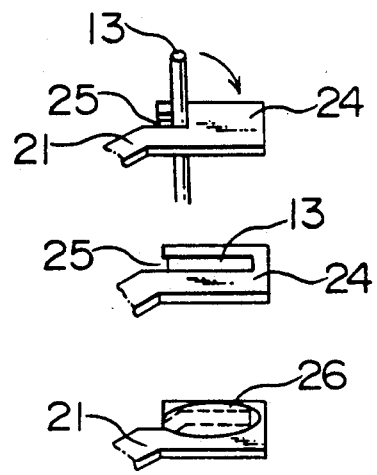
FIG. 8 is a diagram of assistance in explaining the state where the terminal of this invention is connected to a lead end.

FIG. 7 is a diagram of assistance in explaining another example of the terminal used in this invention. FIG. 8 is a diagram of assistance in explaining the state where the terminal is connected to the lead end in this invention.

The terminals 21 and 21' shown in FIG. 7 consist of cylindrical portions 22 and 22' formed at one end thereof into a cylindrical shape to engage the inside surface thereof with ends of a connecting pin (not shown) for connection to an external power source, flat portions 24 and 24' for pushing ends of soft ferrites 12 and 12' (refer to FIG. 1) and electrically connecting to lead ends 13 and 13' of the choke coils 11 and 11', and positioning portions 25 and 25' for positioning the lead ends 13 and 13' shown in FIG. 1.

The positioning portions 25 and 25' may be of any shape, including notches or grooves, so long as the relative positions of the lead ends 13 and 13', and 14 and 14' can be controlled.

Next, the cylindrical portion 22 and 22' and the engaging portions 23 and 23' of the terminals 21 and 21' are engaged with the terminal engaging recesses 34 and 34' and the locking portions 33 and 33'. When the terminals 21 and 21' are installed, the flat portions 24 and 24' of the terminals 21 and 21' push the top ends of the choke coils 11 and 11'.

In this state, the lead end 13 of the choke coil 11 is in such a positional relationship as to make contact with the positioning portion 25 of the terminal 21, as shown in FIG. 8, and bent to an angle of 90 degrees and soldered to the flat portion 24 of the terminal 21 by solder 26.

In this way, the lead ends 13 and 13' of the choke coils 11 and 11' are easily positioned, and soldered with high reliability to the flat portions 24 and 24' having a large contact area.

Thus, electrical connection between the connecting pins and the terminals for connection to an external power source can be performed easily and positively.

According to the aforementioned embodiment of this invention, the choke coils are inserted in the longitudinal direction into the recesses, and the lead ends drawn from the choke coils in the longitudinal direction are positioned by the positioning portions of the terminals. Thus, the choke coils can be positioned easily. In addition, soldering the choke coils to flat portions of a large contact area offers positive and reliable electrical connection.

Moreover, since the lead ends are drawn to the positioning portions of the terminals by inserting the choke coils into the choke-coil housing recesses, the lead ends can be fixedly fitted merely by bending, and need not be temporarily hooked to any parts, such as notches. In addition, soldering is carried out at flat portions of the terminals, molten solder does not flow out. As a result, soldering operation and the state of soldering can be confirmed easily.

Figure 9:
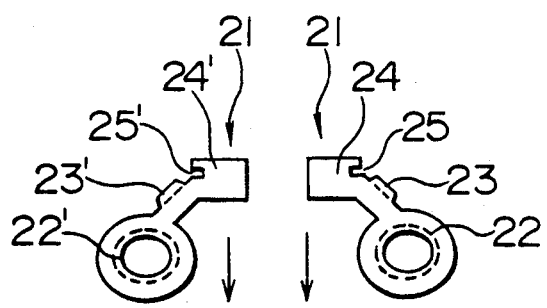
FIG. 9 is a diagram of assistance in explaining still a further example of the terminals used in this invention.
Figure 10:
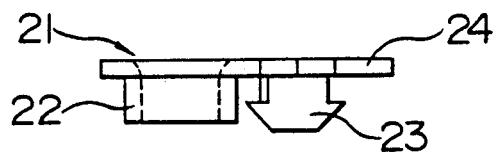
FIG. 10 is a front view of the terminal shown in FIG. 9.
Figure 11:
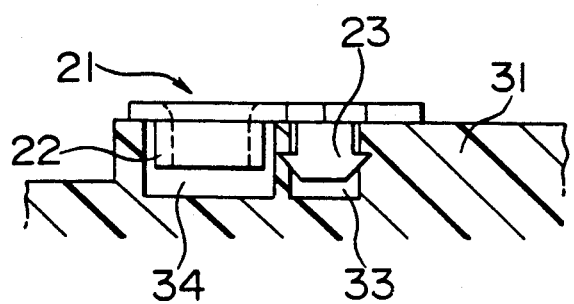
FIG. 11 is a diagram of assistance in explaining the state where the terminal shown in FIG. 10 is fixedly fitted to the end bell.

FIG. 9 is a diagram of assistance in explaining still another example of the terminal used in this invention. FIG. 10 is a front view of the terminal shown in FIG. 9. FIG. 11 is a diagram illustrating the state where the terminal shown in FIG. 10 is fixedly fitted to the end bell of the miniature motor.

The terminals 21 and 21' shown in FIG. 9 consists of cylindrical portions 22 and 22', on one end thereof, formed into a cylindrical shape for engaging the inside surface thereof with the connecting pins (not shown), and engaging portions for engaging with the locking portions 33 and 33' of the end bell 31; and on the other end thereof, flat portions 24 and 24' for pushing the top ends of the soft ferrites 12 and 12' (refer to FIG. 1) and electrically connecting to the lead ends 13 and 13' of the choke coils 11 and 11', and positioning portions 25 and 25' for positioning the lead ends 13 and 13' shown in FIG. 1.

The cylindrical portion of the terminal 21 shown in FIG. 10 is formed by burring. The cylindrical portion 22 of the terminal 21 is formed by burring in such a fashion that the rim of the hole of the cylindrical portion 22 of the terminal 21 as a tapered portion, and in such a size as to leave a gap between the cylindrical portion 22 and the terminal engaging recess 34 shown in FIG. 10.

The positioning portions 25 and 25' of the terminals 21 and 21' may be of nay shape, notches or grooves, so long as the positions of the lead ends 13 and 13' can be controlled.

The other lead end 14 of the choke coil 11 is electrically connected to the brush-holder terminal 18 by soldering, for example.

In the miniature motors of the aforementioned construction, an end of the connecting pins connected to a power source (not shown) is inserted into the cylindrical portion 22 of the terminal 21. At this time, even when there are irregularities in the distance between the two connecting pins, with the consequence that the distance between the connecting pins does not agree with the distance between the two cylindrical portions 22, the connecting pins can be inserted into the cylindrical portions due to the plastic deformation of the cylindrical portions 22.

According to the aforementioned embodiment of this invention, the terminal engaging recess formed on the end bell and the cylindrical portion formed on the terminal in a plastically deformable fashion are engaged with each other with a certain gap. This allows the connecting pin to be positively inserted into the cylindrical portion of the terminal by absorbing some dimensional errors.

Figure 12:
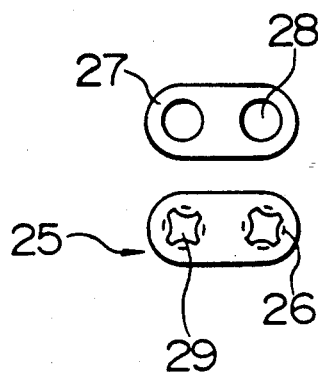
FIG. 12 is a diagram of assistance in explaining an example of an insulating washer used in this invention.
Figure 13:
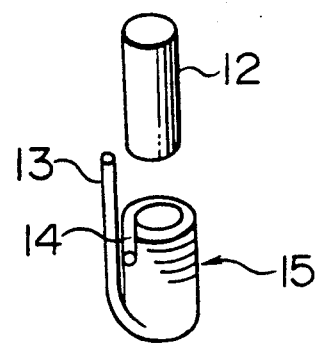
FIG. 13 is a diagram of assistance in explaining a choke coil.
Figure 14:
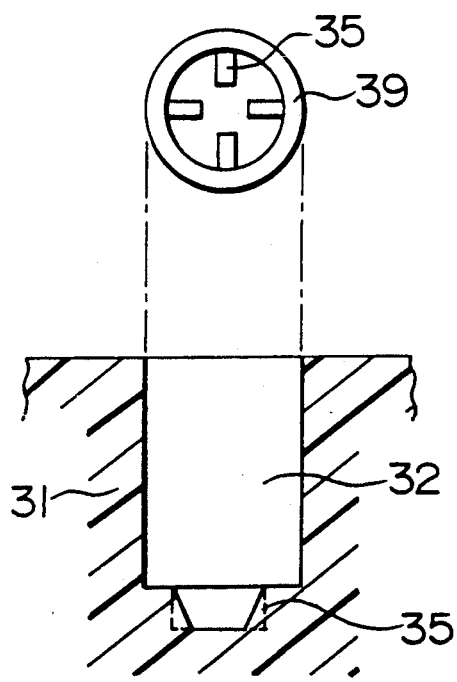
FIG. 14 is a diagram of assistance in explaining a choke-coil housing recess.
Figure 15:
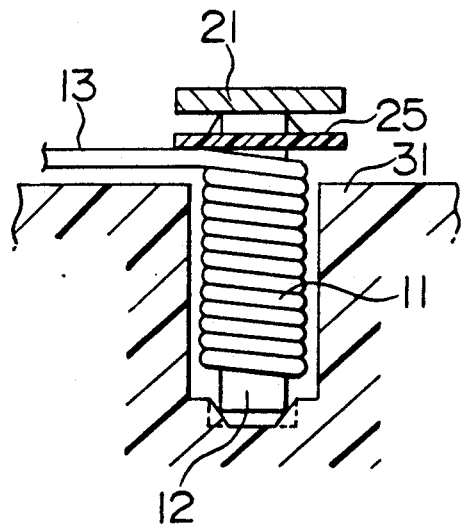
FIG. 15 is a diagram of assistance in explaining the state where the choke coil is housed in the choke-coil housing recess.
Figure 16:
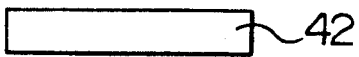
FIG. 16 is a diagram showing a soft ferrite.
Figure 17:
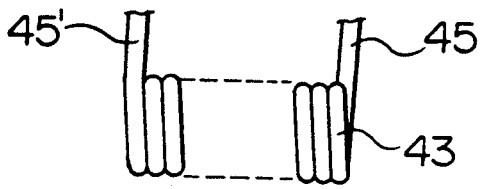
FIG. 17 shows a coil.
Figure 18:
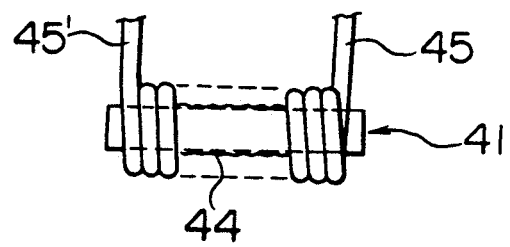
FIG. 18 is a diagram showing a choke coil consisting of a soft ferrite and a coil.
Figure 19:
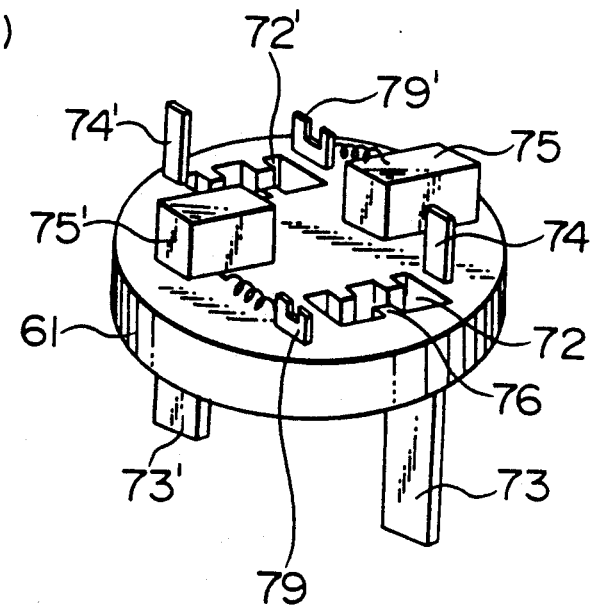
FIG. 19 is a diagram of assistance in explaining a recesses for housing choke coils in a miniature motor.
Figure 20:
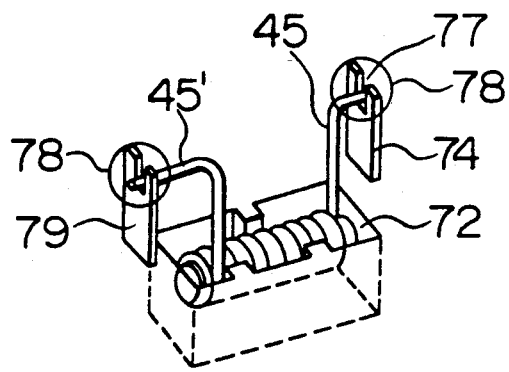
FIG. 20 is a diagram of assistance in explaining a choke coil housed in a recess provided on an end bell of a miniature motor.
Figure 21:
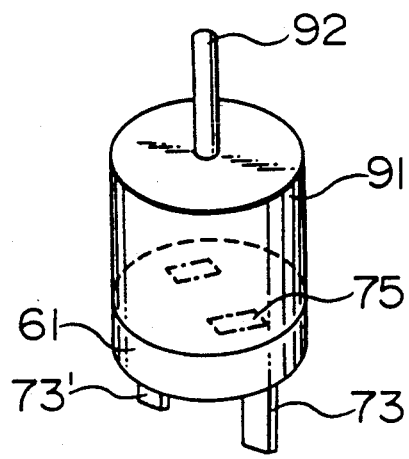
FIG. 21 is a diagram illustrating the external appearance of a miniature motor.
Figure 22:
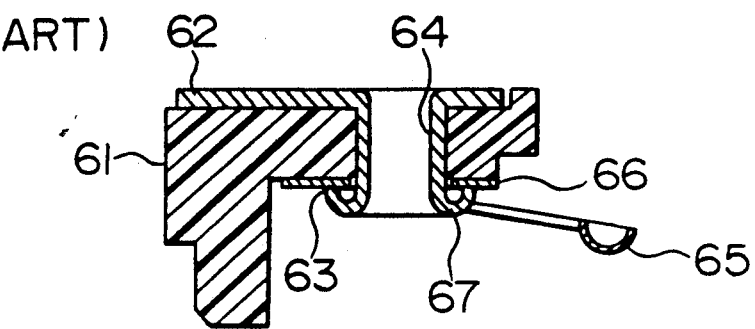
FIG. 22 is a diagram of an another prior art.
Figure 23:
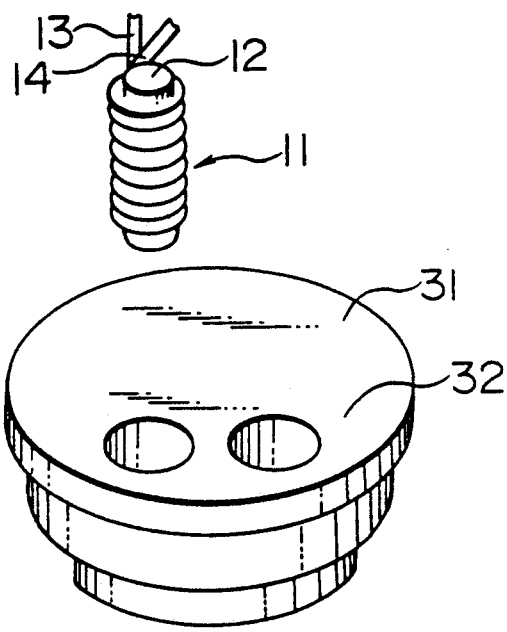
FIG. 23 is a diagram of assistance in explaining the state where the choke coil is inserted into the choke-coil housing recess provided on the end bell.
Figure 24:
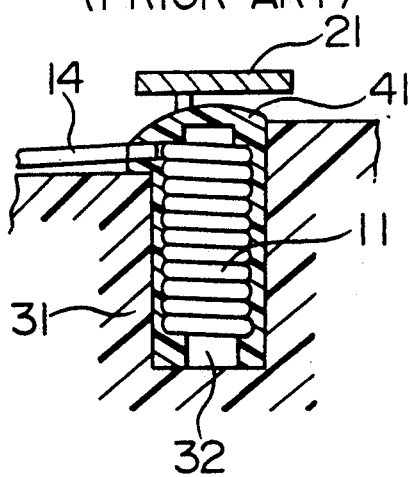
FIG. 24 is a cross-sectional view illustrating the state where the choke coil is fitted to the choke-coil housing recess.

FIG. 12 is a diagram of assistance in explaining an example of an insulating washer used in this invention. FIG. 13 is a diagram of assistance in explaining the choke coil. FIG. 14 is a diagram of assistance in explaining the choke-coil housing recess. FIG. 15 is a diagram of assistance in explaining the state where the choke coil is housed in the choke-coil housing recess.

In FIG. 12, an insulating washer 25 is manufactured in the following manner. An insulating plate 27 is punched from an insulating sheet material, such as a plastic material, into a shape shown in the figure, and an opening 28 whose size is larger than the diameter of the soft ferrite 12 of the choke coil 11, which will be described later, is provided on the insulating plate 27. Then, an inserting hole 29 is provided by forming around the opening 28 a claw portion 26 pointing inwards the opening 28 so as to prevent the soft ferrite 12 inserted into the inserting hole 29 from being rotated.

In FIG. 13, an insulated copper wire is wound on a coil 15, and a lead end 13 is drawn from the lower part in the figure upwards along the winding direction of the coil 15, and the other lead end 14 is drawn sideways from the upper part of the coil 15. A soft ferrite 12 is inserted in the coil 15.

In FIG. 14, a choke-coil housing recess 32 is formed on the end bell, with at least one rib 35 provided on the bottom 39 thereof.

The choke coil 11 is inserted into the choke-coil housing recess 32 provided on the end bell having the aforementioned construction, with the lead end 13 directed upwards. The end of the soft ferrite 12 inserted into the choke coil 11 is press-fitted into the rib 35 formed on the bottom of the choke-coil housing recess 32.

Next, the insulating washer 25 is fitted to the soft ferrite 12. The cylindrical portion 22 and the engaging portion 23 of the terminal 21 are engaged with the terminal engaging recess 34 and the locking portion 33, respectively.

As shown in FIG. 15, the insulating washer 25, which is interposed between the terminal 21 and the lead end 13, prevent the lead end 13 and the terminal 21 from being shortcircuited.

According to the embodiment of this invention, because the insulating washer is interposed between the choke coil and the terminal, not only the lead end of the choke coil is insulated from the terminal, but also the distance between the two choke coils is kept at a predetermined value. Thus, the relative positions of the lead end of the choke coil and the portion at which the lead end is connected are kept at a predetermined value, leading to improved accuracy and reliability in automatic soldering.

Since the choke coil is inserted in the longitudinal direction into the recess provided on the end bell, and the choke coil is fixed in position by the bottom of the recess and the terminal, the use of adhesive is eliminated. Thus, time and labor to apply and dry adhesive can also be eliminated. This helps manufacture inexpensive miniature motors.

As a result of the elimination of the use of adhesive, small choke coils having good heat dissipation properties can be provided. The miniature motors according to this invention are suitable for use in fuel pumps, etc.

What is claimed is:

1. A choke-coil fixture for miniature motors, comprising:
   an end bell closing an end of a motor housing;
   choke-coils positioned in recesses formed in said end bell, said choke-coils having an inserted end and an opposite lead end, said recesses locking said first end and said opposite lead end when the choke-coil is inserted in a longitudinal direction into one of said recesses;
   a terminal for electrical connection with said choke-coil and pushing said opposite end of said choke-coil including:
   flat portions electrically connected to said opposite lead end of said choke-coil and pushing said opposite lead end of said choke-coils,
   engaging portions for fixedly fitting said terminals by locking said terminals to said end bell,
   positioning portions for positioning said terminals with respect to said opposite lead end of said choke-coil, and
   cylindrical portions for connecting the terminal to pins feeding electric power.

2. A choke-coil fixture for miniature motors as set forth in claim 1 wherein said cylindrical portion engages with and connects to a power-feeding connecting pin and said cylindrical portion is adapted to be flexible in size by being plastically deformed.

3. A choke-coil fixture for miniature motors as set forth in claim 1 further comprising insulating washers for insulating the opposite lead end from said terminals by fitting to said choke coils inserted into said choke-coil housing recesses.

* * * * *

UNITED STATES PATENT AND TRADEMARK OFFICE
CERTIFICATE OF CORRECTION

PATENT NO. : 5,221,130

DATED : June 22, 1993

INVENTOR(S) : Hajime Satoh, et al

It is certified that error appears in the above-identified patent and that said Letters Patent is hereby corrected as shown below:

On the title page, item [73], correct the Assignee data to
read:  Mabuchi Motor Co., Ltd.
       Chiba-Ken, Japan Correct the Attorney, Agent, or Firm data to read:  McGlew and Tuttle Signed and Sealed this Twenty-first Day of September, 1993

*Attest:*

BRUCE LEHMAN

*Attesting Officer*     *Commissioner of Patents and Trademarks*